United States Patent [19]
Pope

[11] Patent Number: 5,963,624
[45] Date of Patent: Oct. 5, 1999

[54] DIGITAL CORDLESS TELEPHONE WITH REMOTE CONTROL FEATURE

[75] Inventor: Steven M. Pope, Los Gatos, Calif.

[73] Assignee: Zilog, Inc., Campbell, Calif.

[21] Appl. No.: 08/986,273

[22] Filed: Dec. 5, 1997

[51] Int. Cl.$^6$ .................................................. H04M 11/00
[52] U.S. Cl. ...................... 379/110.01; 455/420; 348/734
[58] Field of Search ............................. 379/110.01, 90.01, 379/102.01–102.03; 455/420, 462, 402; 348/734

[56] References Cited

U.S. PATENT DOCUMENTS

| | | |
|---|---|---|
| 4,508,935 | 4/1985 | Mastromoro ............................. 455/420 |
| 4,771,283 | 9/1988 | Imoto ...................................... 348/734 |
| 4,995,053 | 2/1991 | Simpson et al. ......................... 375/200 |
| 5,014,125 | 5/1991 | Pocock et al. . | 
| 5,128,987 | 7/1992 | McDonough et al. . |
| 5,542,102 | 7/1996 | Smith et al. . |
| 5,570,415 | 10/1996 | Stretton et al. . |
| 5,671,267 | 9/1997 | August et al. ............................ 455/420 |
| 5,802,467 | 9/1998 | Salazar et al. ........................... 455/420 |

FOREIGN PATENT DOCUMENTS 90-7064   9/1990   Rep. of Korea .

*Primary Examiner*—Wing F. Chan
*Attorney, Agent, or Firm*—Majestic, Parsons, Siebert & Hsue

[57] ABSTRACT

Storing a variety of appliance control codes in a cordless digital telephone handset has the advantage that the cordless digital telephone handset can be used as a universal remote for a variety of electrical appliances. The cordless digital telephone handset need not be in the direct "line-of-sight" of the appliances in order to work. The appliance control data can be sent along with voice data in a method such as digital spread spectrum communications.

68 Claims, 3 Drawing Sheets

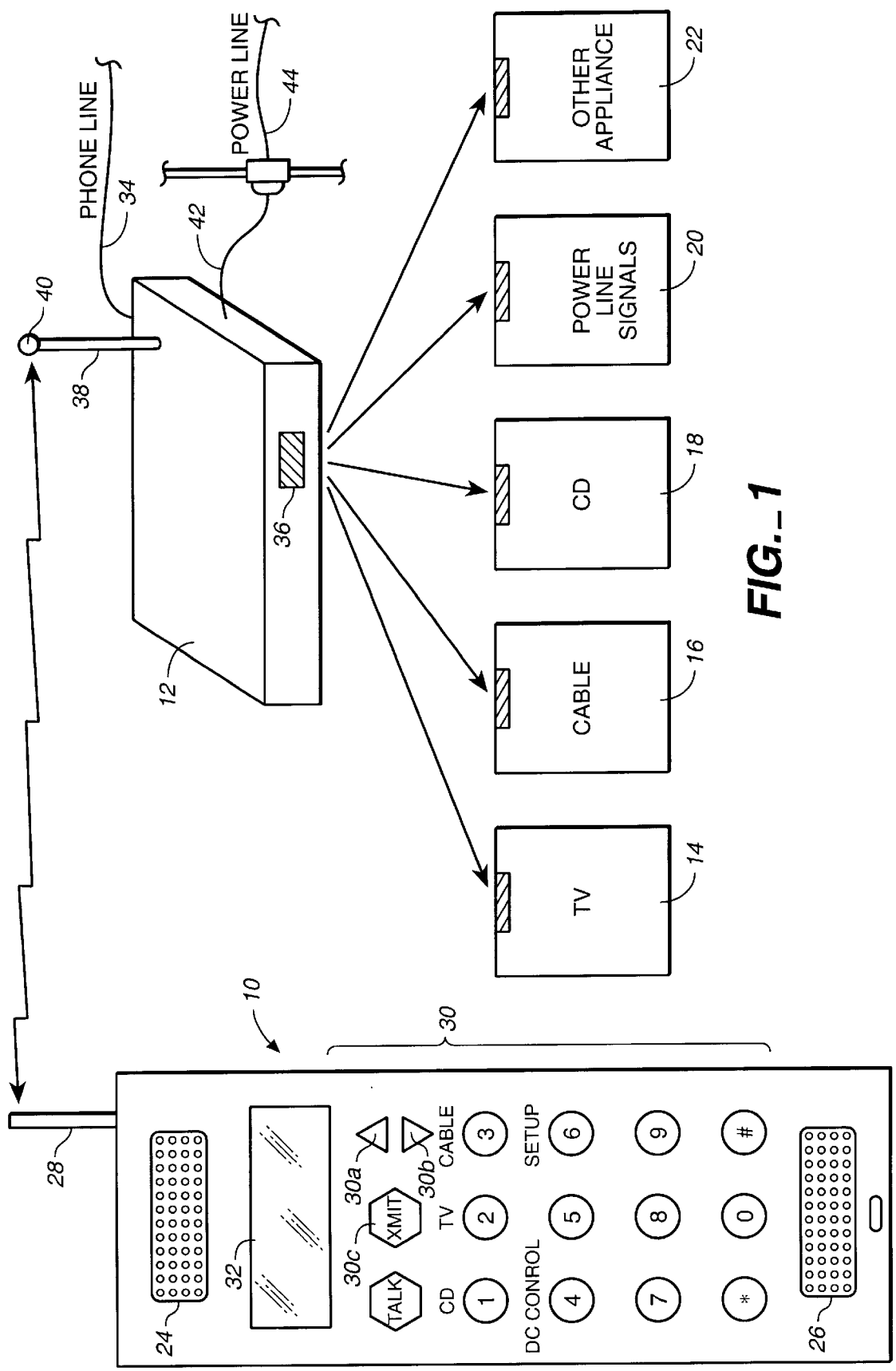
FIG._1

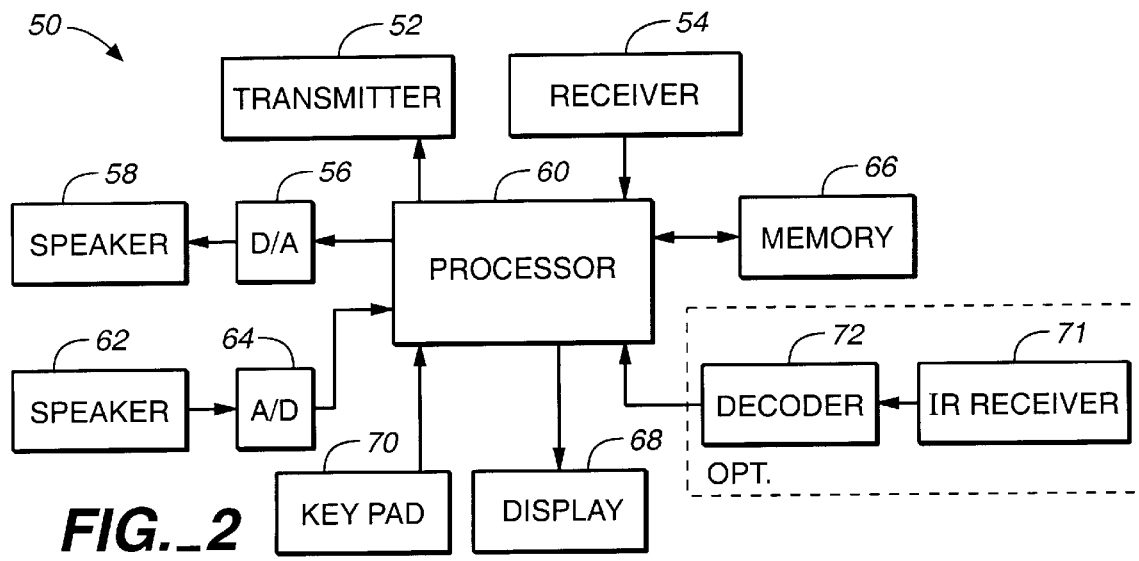
FIG._2
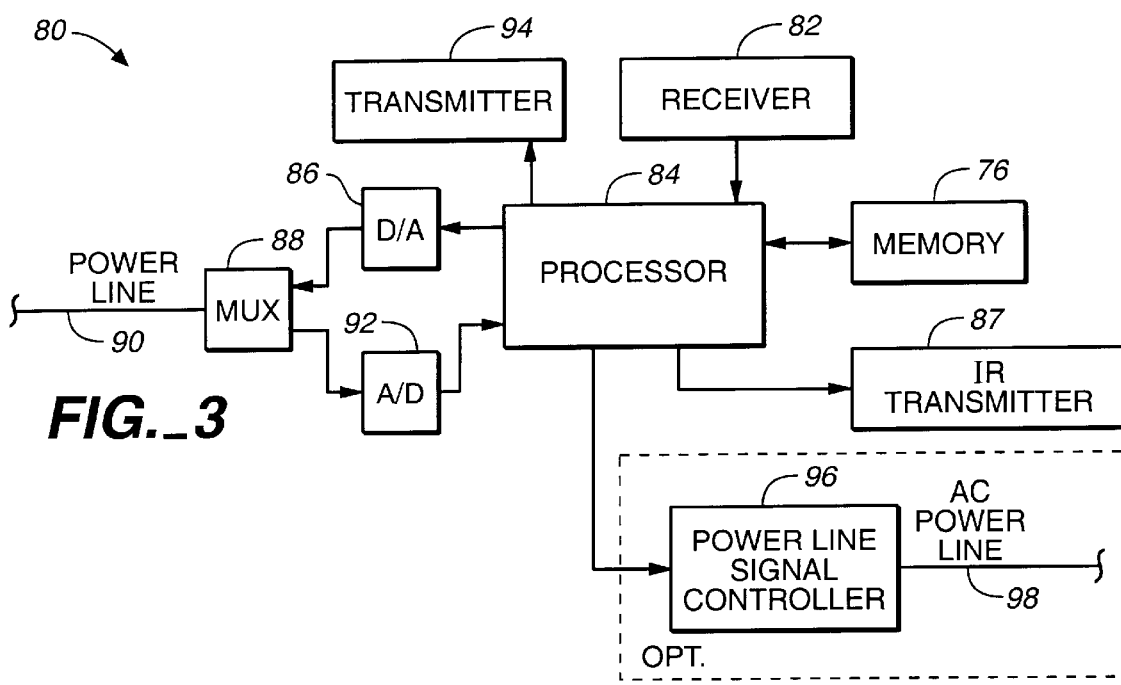
FIG._3
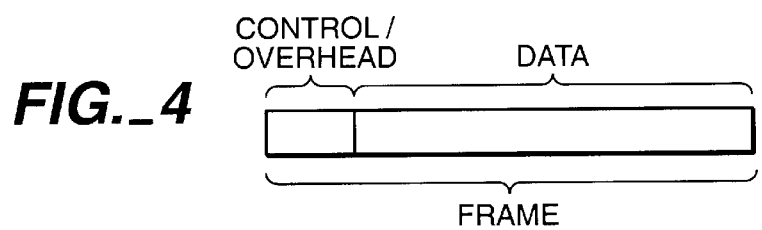
FIG._4

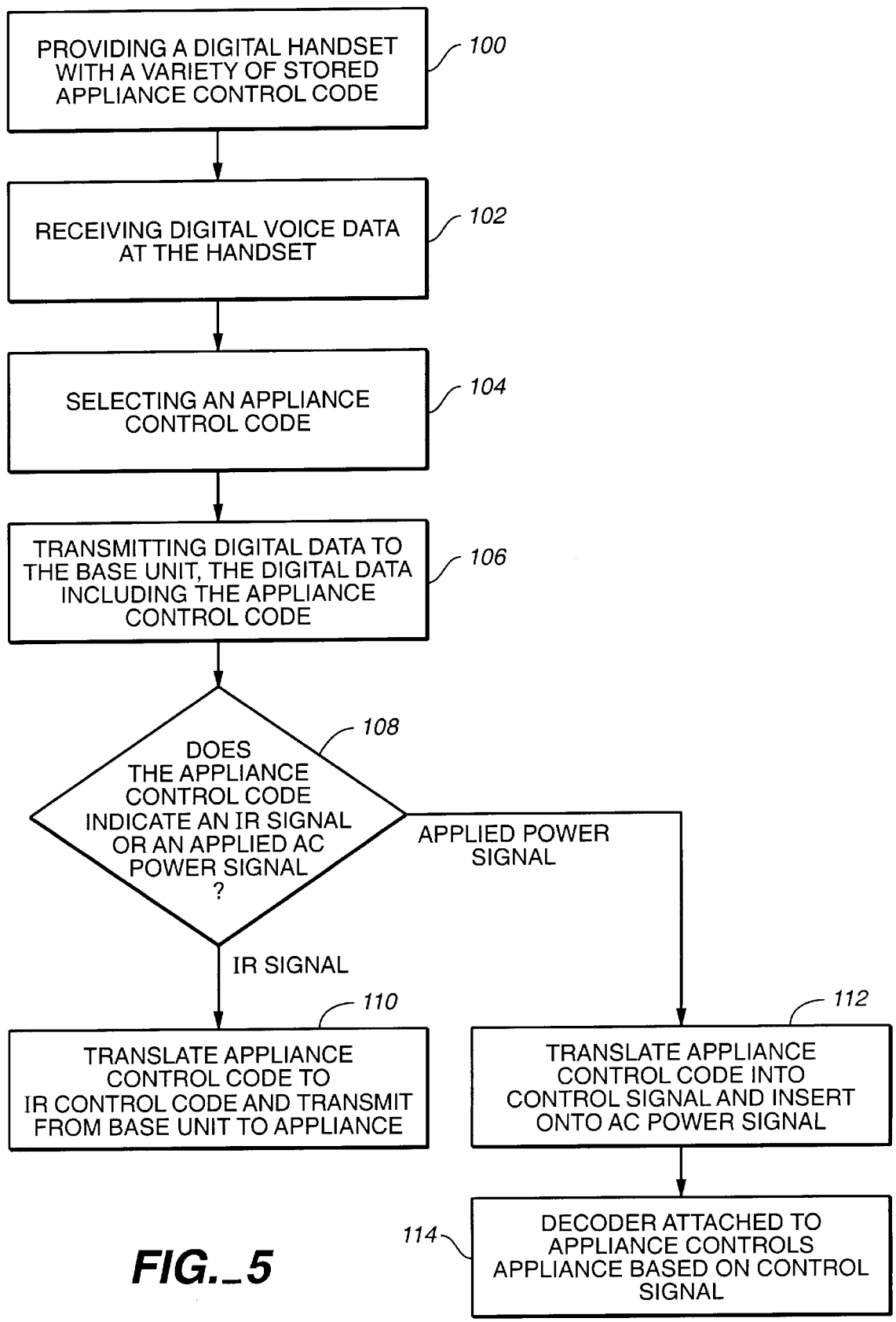
FIG._5

uses a digital cordless telephone handset to store a variety of appliance control codes. These appliance control codes can be transmitted to a base unit. The base unit can translate the appliance control codes to control signals such as infrared control signals, to control an electrical appliance.

DIGITAL CORDLESS TELEPHONE WITH REMOTE CONTROL FEATURE

BACKGROUND OF THE INVENTION

The present invention relates to telephones used in conjunction with electrical appliances, such as televisions, compact disc players, cable controllers, and the like.

Some prior telephone systems have used a base unit to automatically mute a television set and other devices when a telephone call is received. McDonough U.S. Pat. No. 5,128,987 describes a controller responsive to an off-hook condition which automatically mutes the television set. The controller sends infrared signals to the television.

Smith, et al. U.S. Pat. No. 5,542,102 describes a telephone base unit that can be programmed to mute a television set or other electronic device in response to a speakerphone at the base unit switching on, or a call being received at the base unit.

Another reference, Korea Patent No. 90-7064, describes an infrared transmitter positioned on a telephone handset to be used to mute a television set or the like by transmitting an infrared signal from the handset to the electronic device. This allows the electronic device in the line of sight of the handset to be muted.

It is desired to have an improved system for use of a telephone in conjunction with other electrical appliances.

SUMMARY OF THE INVENTION

The present invention uses a digital cordless telephone handset to store a variety of appliance control codes. These appliance control codes can be transmitted to a base unit. The base unit can translate the appliance control codes to control signals such as infrared control signals, to control an electrical appliance.

The advantage of this system is that the use of a number of appliance control codes can allow different features on one or more electrical appliances to be controlled through the digital cordless telephone handset. The digital cordless telephone can use digital spread spectrum communication between the handset and the base unit. This allows the handset to be in a different room or a significant distance away from the base unit and still control the electrical device. That is an advantage over a universal infrared remote and the system of Korea Patent No. 90-7064. The handset does not need to be in the line-of-sight of the appliance. In this manner, the telephone can be used as a type of universal remote controlling different electrical appliances even when the user is in another room.

The digital cordless telephone handset is likely to be carried by the user into different rooms or kept in the room used most often. With the remote control feature of the present invention, when a call is received, the user can mute a television or compact disc player. This does not occur automatically. Thus, if the music is playing softly and/or someone else is listening to music or watching television, the mute feature will not automatically be activated when a call is received. Additionally, the telephone handset can be used to send appliance control signals other than just "mute." These other appliance control codes include compact disc player track select, television channel select, and volume controls.

The advantage of using a digital telephone in the present invention is that the digital telephone allows control information to be multiplexed with the voice data transmitted to the base unit. Control information is already sent in an overhead portion of the digital transmission of most digital telephones. The appliance control code can "free-ride" on this overhead portion. In this manner, the required modifications to current digital telephones is minimized. In one embodiment, the appliance control codes are sent in an overhead portion of a data frame. The existing data structure need not be modified to allow the appliance control codes to be sent. The overhead or control portion of the frame typically has undefined overhead codes which can be defined as the appliance control codes.

Additionally, a display on the handset can set up a menu pointing to different appliance controls which can be selected. The handset can store a number of codes indicating different vendors for compact disc players, television sets, etc.

One embodiment of the present invention uses control signals placed on a house's power line. These control signals can be used to control appliances attached to the system, such as the house lights.

Optionally, a universal remote decoder of the type used for universal remotes can be attached to the handset or to the base unit. This can be used so that the devices can learn the infrared control signals associated with the different electrical appliances.

BRIEF DESCRIPTION OF THE DRAWINGS

The above and other features and aspects of the present invention will become more apparent upon reading the following detailed description in conjunction with the accompanying drawings.

FIG. 1 is a diagram showing the system of the present invention including a handset, a base unit, and associated electrical appliances.

FIG. 2 is a diagram of a handset of the present invention.

FIG. 3 is a diagram of a base unit of the present invention.

FIG. 4 is a diagram of a data structure used with one embodiment of the present invention.

FIG. 5 is a flow chart illustrating the method of the present invention.

DETAILED DESCRIPTION OF THE PREFERRED EMBODIMENT

FIG. 1 is a diagram showing a handset 10, a base unit 12, and electrical appliances 14–22. The handset 10 is a cordless digital telephone handset. It includes speakers 24 and 26, an antenna 28, a keypad 30, and a display 32. The cordless digital telephone handset includes a memory 66 shown in FIG. 2, which can be used to store the appliance control codes. Preferably, the appliance control codes can be transmitted to the base unit 12 along with digital voice data. In a preferred embodiment, the voice data and the appliance control codes are sent by digital spread spectrum communication. Spread spectrum communication uses a broad bandwidth to transmit data in order to reduce the errors in the data transmission. The selection of the appliance control codes can be done through the keypad 30 or there can be dedicated keys for some or all of the appliance control functions.

Keypad 30 includes the numbers 1–9, the "star" and the "pound" key. Additionally, "up arrow" key 30a and "down arrow" key 30b can be used to scroll through a menu. A "transmit" key 30c can be used to transmit the appliance control code once the appliance control has been selected. In one embodiment, the user gets into the menu by pressing an "up arrow" or a "down arrow" key. Alternately a "menu"

button (not shown) is used. The keys for numbers 1–9 can have different meanings once the user is in the menu. Menu functions can be printed above the normal telephone control keys. FIG. 1 shows compact disc, television, cable and AC signal control menu-function buttons. The setup menu can be entered, one of these buttons pressed, and then using the up and down arrows, the specific controls for a given electrical appliance can be scrolled through. The different appliance controls can be listed in the order of frequency of use. For example, the "mute" function could be the first function listed in each menu selection.

Alternately, individual functions can be mapped with the associated buttons of the keypad, and a display 32 need not be used. Buttons similar to a "shift," "alt," and "control" on a normal computer keypad can be used to change the meanings of buttons "0" to "9," "star," and "pound." The different meanings associated with different buttons can be printed in different colors, which are the same colors of the associated buttons "shift," "alt," or "control."

A "set up" button can be used to set up the handset to display only the appliance control codes for the appliances that the user owns.

In a preferred embodiment, the handset 10 communicates with the base unit 12 by digital spread spectrum communications. This means that the handset can be in a different room and/or a significant distance away from the base unit 12.

The base unit 12 is used to transmit and receive voice data to and from the handset. The base unit 12 is connected to the telephone line 34 to receive the analog telephone signal, convert it to a digital signal, and transfer it to the handset, as well as receiving the digital signal from the handset and converting it to an analog signal sent on the telephone line 34. These activities of a digital telephone are conventional.

Base unit 12 also translates the appliance control code to control the appliance. For example, an appliance control code can be converted into an infrared control code, and transmitted through outer window 36 to the electrical appliances 14–22. The infrared control code is a pulse train used to control the infrared transmitter.

In a preferred embodiment, the infrared transmitter is a conventional transistor attached to an infrared bulb. When the signal at the base of the transistor is high, the bulb draws current and glows in an infrared region. The infrared code is typically a train of pulses, each pulse being 1.6 microseconds long, indicating a high or low bit.

One advantage of having the infrared transmitter attached to the base unit 12 is that the base unit 12 can be typically powered by house current. Since no battery is used, the infrared transmitter can draw more power than is used in battery-type systems. For example, if a button is continuously pressed in a battery-type system, in order to conserve power the infrared signal is not continuously sent, but is sent intermittently. The base unit 12 connected to AC power need not be limited in this fashion. Additionally, it is also possible to have the base unit 12 supply a greater amount of power to the infrared transmitter to transmit a greater amount of infrared energy. In this manner, it may be possible for the infrared bulb to not be focused directly towards the appliance.

The base unit 12 is typically pointed so that the window 36 faces the appliance to be controlled. In one embodiment, on top of the antenna 38 an infrared bulb 40 is positioned which can be tilted toward the appliance. The bulb 40 can be used for transmitting the infrared controls. The bulb 40 can have an associated directing mirror (not shown).

Appliances that are controlled by the infrared signals include television 14, cable controller 16, and compact disc player 18. Additionally, a power line signal controller 20 can be used. The power line signal controller 20 is attached to a power line which puts a high frequency control signal on the AC power supply. Different receivers can be connected to the house's AC power lines, and the electrical appliance attached to the receiver is controlled by the high-frequency control signal placed on the AC power line. Each receiver is associated with a different receiver code. In an alternate embodiment, the base unit 12 can be connected by a power cord 42 to the power line 44. The base unit 12 can use similar logic to that described above to put a high-frequency control signal upon the power line 44. These types of systems are commercially available. One example of such a system is a universal remote available from Universal Electronics.

FIG. 2 is a diagram of a handset 50 of the present invention. Handset 50 includes the transmitter 52 for sending digital data, such as voice data and the appliance control codes, to the base unit as well as a receiver unit 54. Typically, the received data is sent from the receiver to the processor, which sends the voice data to a digital/analog converter 56 and off to the speaker 58. Speaker 62 produces an analog signal of the user's voice, converts it with an analog-to-digital converter 64, and sends the digitized data to the processor 60. Processor 60 can treat the digitized data to be sent over the transmitter 52. The appliance control codes are stored in a memory 66. Memory 66 can be a read-only memory (ROM), or can be a random-access memory (RAM). Display 68 and keypad 70 can be used to select an appliance control code out of the memory 66. The appliance control code can be transmitted through the transmitter 52 to the base unit.

FIG. 4 is a diagram illustrating a data structure which can be used with the present invention. FIG. 4 illustrates a frame of data, including a control/overhead portion and a data portion. In one embodiment, the frame is a 142-bit frame with 16 bits used for the control/overhead, sometimes called a Signaling Multiplexer (SMUX) control word. In a preferred embodiment, the appliance control code is sent to the base unit from the handset within the control/overhead portion of the frame of data. This has the advantage that the digital telephone need not be drastically changed. The base unit already checks the valve of the control/overhead portion against a table to aid in the data transmission. The overhead portion has 16 possible bits for the control word, and only a relatively small number of the possible combinations are used to control the data transmission. Other possible combinations can be defined as appliance control codes. Once an appliance control code is received by the base unit, the base unit will know to transfer the control code to an appliance.

Looking again at FIG. 2, optionally an infrared receiver 70 and decoder 72 are used to receive an infrared signal from a controller, such as a television remote control, and send this signal to the processor 60. Processor 60 can assign an appliance control code corresponding to this control information, and store this code in memory 66. The decoded infrared control signal can then be transmitted to the base unit. In this way, the handset can be used to learn different control codes. This is similar to what is done in commercially-available universal infrared remotes.

FIG. 3 illustrates a base unit 80 used with the present invention. The receiver 82 receives the digital data from the handset. This data is then sent to the processor 84. Voice data can be sent out through the digital analog converter 76 and multiplexer 88 to the telephone line 90. Data from the telephone line can be sent to the multiplexer 88 and analogto-digital converter 92 to the processor 84. The digital voice data is then sent from the processor 84 to the transmitter 94. The processor 84 and the processor 60 shown in FIG. 2 can construct the data in the frames to digitally multiplex the data between the control information and the voice data information. A control word is stripped from the received digital data at the base unit by the processor. If the control word is an appliance control code, the processor looks at the memory 86 to get the control code, such as an infrared control code. This control code is then sent to the infrared transmitter, which has the infrared transmitter 88. Optionally, the memory 86 can store the code for the power line signal, which can be sent to the optional power line signal controller 96, and then onto the AC power line 98.

FIG. 5 is a flow chart illustrating the present invention. In step 100, the digital handset is provided with a variety of stored appliance control codes. As discussed above, appliance control data can be stored in a ROM containing a variety of electronic devices. Alternately, as shown in FIG. 3, the digital handset can decode information from an infrared decoder and store it in memory. In step 102, digital voice data is received at the handset from the base unit. In step 104, the appliance control code is selected by the user from keyboard selections. Optionally, a displayed menu can be used. In step 106, the digital data is transmitted to the base unit. The digital data includes the appliance control code. The digital data can be multiplexed so that an appliance control code can be in the same frame as digital voice data, or the appliance control code can be sent at a different time than the digital voice data. In step 108, if the appliance control code indicates an infrared signal, in step 110 the appliance control code is translated to an infrared control code and transmitted from the base unit to the appliance.

If the appliance control code indicates an applied AC power signal, in step 112, the appliance control code is translated into a control signal and inserted onto the AC power signal. In step 114, a decoder attached to the appliance controls the appliance based upon the control signals which were placed upon the AC power line.

In an alternate embodiment, the appliance control code stored in the handset can correspond to the entire infrared control signal or the power line control signal. This alternate method has the advantage that the base unit need not use the appliance control code as a pointer to the actual code, but can directly output the codes from the handset through the infrared transmitter or the power line signal controller. A disadvantage of this method is that, for the systems that use transmittal frames of digital data, the overhead control portion of the frame of data is only 16 bits long and may not be sufficient to completely code the infrared control data or the AC power line signal data.

Various details of the implementation and method are merely illustrative of the invention. It will be understood that various changes in details may be made within the scope of the invention, which is to be limited only by the appended claims.

What is claimed is:

1. A system comprising a cordless digital telephone handset adapted to receive and transmit digital data, the handset further comprising a memory to store a variety of appliance control codes, the handset having an input device allowing the selection of one of the appliance control codes such that the one of the appliance control codes is transmitted to a base unit, wherein the base unit translates the one of the appliance control codes to produce an infrared control code to send to an appliance, and wherein the digital data is transmitted from the handset to the base unit in frames of bits, the frames including an overhead portion and a data portion, wherein the handset is adapted to send the one of the appliance control codes to the base unit within the overhead portion of one of the frames.

2. The system of claim 1, wherein the handset includes a device to read infrared control codes from an infrared controller to memorize the infrared control codes.

3. The system of claim 1, wherein the base unit has an antenna for receiving and transmitting the digital data and wherein an infrared bulb is positioned on the antenna.

4. The system of claim 1, wherein the appliance control codes correspond to infrared instruction codes to send to an appliance.

5. The system of claim 1, wherein the base unit includes a memory storing multiple infrared control codes including the infrared control code and wherein the one of the appliance control codes is a pointer to the infrared control code stored in the memory.

6. The system of claim 1, wherein digital data is transmitted from the handset to the base unit by digital spread spectrum communication.

7. The system of claim 1, wherein the base unit includes an infrared transmitter to send the infrared control code to the appliance.

8. The system of claim 1, wherein the appliance comprises a compact disc player.

9. The system of claim 1, the appliance comprises a television.

10. The system of claim 1, wherein the base unit is adapted to translate the one of the appliance control codes into a signal placed on an alternating current power signal of a power line to control the appliance.

11. The system of claim 1, wherein the base unit is adapted to translate the one of the appliance control codes into an infrared signal transmitted to a converter that converts the infrared signal to a signal placed on an alternating current power signal of a power line to control the appliance.

12. The system of claim 1, wherein the handset includes a display.

13. A system comprising the steps of:
   providing a cordless digital telephone handset having a variety of appliance control codes stored in a memory;
   receiving digital data in the telephone handset from a base unit;
   transmitting digital data to the base unit, the digital data including voice data and one of the appliance control codes, wherein the digital data is transmitted from the handset to the base unit in frames of bits, the frames including an overhead portion and a data portion, wherein the handset sends the one of the appliance control codes to the base unit within the overhead portion of one of the frames; and
   controlling the operation of an appliance by transmitting control information from the base unit to the appliance as indicated by the one of the appliance control codes.

14. The method of claim 13, further comprising the step of selecting the one of the appliance control codes.

15. The method of claim 13, wherein the controlling step comprises translating the one of the appliance control codes to produce an infrared control code and transmitting the infrared control code to the appliance.

16. The method of claim 13, wherein the controlling step comprises translating the one of the appliance control codes into a signal placed on an alternating current power signal of a power line to control the appliance.

17. The method of claim 13, wherein the translating step comprises translating the one of the appliance control codes to produce an infrared control code and transmitting the infrared control code to a device that converts the infrared control code into a signal placed on an alternating current power signal of a power line to control the appliance.

18. A method comprising the steps of:
providing a cordless digital telephone handset having a variety of appliance control codes stored in a memory;
receiving digital data in the telephone handset from a base unit;
transmitting digital data to the base unit, the digital data including voice data and one of the appliance control codes, wherein the digital data is transmitted from the handset to the base unit in frames of bits, the frames including an overhead portion and a data portion, wherein the handset sends the one of the appliance control codes to the base unit within the overhead portion of one of the frames; and
controlling the operation of an appliance by transmitting control information from the base unit to the appliance as indicated by the one of the appliance control codes, wherein the controlling step translates the one of the appliance control codes to produce an infrared control code and thereby sends the infrared control code to the appliance.

19. The method of claim 18, wherein the translating step comprises translating the one of the appliance control codes to produce an infrared control code and transmitting the infrared control code to a device that converts the infrared control code into a signal placed on an alternating current power signal of a power line to control the appliance.

20. The method of claim 18, further comprising the step of selecting the one of the appliance control codes.

21. The method of claim 18, wherein the controlling step comprises translating the one of the appliance control codes into a signal placed on an alternating current power signal of a power line to control the appliance.

22. The method of claim 18, wherein the transmitting step transmits the digital data to the base unit by digital spread spectrum communication.

23. A telecommunication system comprising:
a base unit having a base memory for storing infrared control signals, and
a cordless digital telephone handset having a handset memory for storing appliance control codes,
wherein the handset transmits digital data, including voice data and one of the appliance control codes, in frames of bits to the base unit, the frames having an overhead control portion and a data portion, the one of the appliance control codes located within the overhead control portion of one of the frames,
wherein the base unit translates the one of the appliance control codes to produce one of the infrared control signals when the base unit receives the one of the appliance control codes, and
wherein the base unit as a result sends the one of the infrared control signals to an appliance to control the appliance.

24. The telecommunication system of claim 23, wherein the digital data is transmitted from the handset to the base unit by digital spread spectrum communication.

25. The telecommunication system of claim 23, wherein the base unit includes an infrared transmitter to send the one of the infrared control signals to the appliance.

26. The telecommunication system of claim 23, wherein the appliance is a compact disc player.

27. The telecommunication system of claim 23, wherein the appliance is a television.

28. The telecommunication system of claim 23, wherein the base unit translates the one of the appliance control codes into a control signal placed on an alternating current power signal of a power line to control the appliance.

29. The telecommunication system of claim 23, wherein the base unit transmits the one of the infrared control signals to a converter that converts the one of the infrared control signals to a control signal placed on an alternating current power signal of a power line to control the appliance.

30. The telecommunication system of claim 23, wherein the handset includes a display.

31. The telecommunication system of claim 23, wherein the handset further has a device for receiving an infrared control signal from an infrared controller and for sending the infrared control signal to a processor, the processor thereby assigns an appliance control code corresponding to the infrared control signal and stores the appliance control code in the handset memory.

32. The telecommunication system of claim 23, wherein the base unit has an antenna for receiving and transmitting the digital data, the antenna has an infrared bulb positioning thereon.

33. The telecommunication system of claim 31, wherein the infrared controller is a television remote control.

34. The telecommunication system of claim 23, wherein the appliance control codes correspond to power line control signals to send to the appliance.

35. The telecommunication system of claim 23, wherein the handset further has an input device for selecting the one of the appliance control codes.

36. The telecommunication system of claim 23, wherein the one of the appliance control codes is a pointer to the one of the infrared control signal stored in the base memory.

37. The telecommunication system of claim 23, wherein the appliance control codes correspond to the infrared control signals.

38. A system comprising a cordless digital telephone handset adapted to receive and transmit digital data, the handset further comprising a memory to store a variety of appliance control codes, the handset having an input device allowing the selection of one of the appliance control codes such that the one of the appliance control codes is transmitted to a base unit, wherein the base unit translates the one of the appliance control codes to produce an infrared control code to send to an appliance.

39. The system of claim 38, wherein the digital data is transmitted from the handset to the base unit in frames of bits, the frames including an overhead portion and a data portion, wherein the handset is adapted to send the one of the appliance control codes to the base unit within the overhead portion of one of the frames.

40. The system of claim 38, wherein the digital data is transmitted from the handset to the base unit by digital spread spectrum communication.

41. The system of claim 38, wherein the base unit includes an infrared transmitter to send the infrared control code to the appliance.

42. The system of claim 38, wherein the appliance comprises a compact disc player.

43. The system of claim 38, the appliance comprises a television.

44. The system of claim 38, wherein the base unit is adapted to translate the one of the appliance control codes into a signal placed on an alternating current power signal of a power line to control the appliance.

45. The system of claim 38, wherein the base unit is adapted to translate the one of the appliance control codes into an infrared signal transmitted to a converter that converts the infrared signal to a signal placed on an alternating current power signal of a power line to control the appliance.

46. The system of claim 38, wherein the handset includes a display.

47. The system of claim 38, wherein the handset includes a device to read infrared control codes from an infrared controller to memorize the infrared control codes.

48. The system of claim 38, wherein the base unit has an antenna for receiving and transmitting the digital data and wherein an infrared bulb is positioned on the antenna.

49. The system of claim 38, wherein the base unit includes a memory storing multiple infrared control codes including the infrared control code and wherein the one of the appliance control codes is a pointer to the infrared control code stored in the memory.

50. The system of claim 38, wherein the appliance control codes correspond to infrared instruction codes to send to the appliance.

51. A system comprising a cordless digital telephone handset adapted to receive and transmit digital data, the handset further comprising a memory to store a variety of appliance control codes, the handset having an input device allowing the selection of one of the appliance control codes such that the one of the appliance control codes is transmitted to a base unit, wherein the digital data is transmitted from the handset to the base unit in frames of bits, the frames including an overhead portion and a data portion, wherein the handset is adapted to send the one of the appliance control codes to the base unit within the overhead portion of one of the frames.

52. The system of claim 51, wherein the digital data is transmitted from the handset to the base unit by digital spread spectrum communication.

53. The system of claim 51, wherein the base unit includes an infrared transmitter to send the infrared control code to the appliance.

54. The system of claim 51, the appliance comprises a compact disc player.

55. The system of claim 51, the appliance comprises a television.

56. The system of claim 51, wherein the base unit is adapted to translate the one of the appliance control codes into a signal placed on an alternating current power signal of a power line to control the appliance.

57. The system of claim 51, wherein the base unit is adapted to translate the one of the appliance control codes into an infrared signal transmitted to a converter that converts the infrared signal to a signal placed on an alternating current power signal of a power line to control the appliance.

58. The system of claim 51, wherein the handset includes a display.

59. The system of claim 51, wherein the handset includes a device to read infrared control codes from an infrared controller to memorize the infrared control codes.

60. The system of claim 51, wherein the base unit has an antenna for receiving and transmitting the digital data and wherein an infrared bulb is positioned on the antenna.

61. The system of claim 51, wherein the base unit translates the one of the appliance control codes to produce an infrared control code to send to an appliance.

62. The system of claim 61, wherein the base unit includes a memory storing multiple infrared control codes including the infrared control code and wherein the one of the appliance control codes is a pointer to the infrared control code stored in the memory.

63. The system of claim 51, wherein the appliance control codes correspond to infrared instruction codes to send to the appliance.

64. A method comprising the steps of:
providing a cordless digital telephone handset having a variety of appliance control codes stored in a memory;
receiving digital data in the telephone handset from a base unit;
transmitting digital data to the base unit, the digital data including voice data and one of the appliance control codes; and
controlling the operation of an appliance by transmitting control information from the base unit to the appliance as indicated by the one of the appliance control codes, wherein the controlling step translates the one of the appliance control codes to produce an infrared control code and thereby sends the infrared control code to the appliance.

65. The method of claim 64, further comprising the step of selecting the one of the appliance control codes.

66. The method of claim 64, wherein the controlling step comprises translating the one of the appliance control codes into a signal placed on an alternating current power signal of a power line to control the appliance.

67. The method of claim 64, wherein the translating step comprises translating the one of the appliance control codes to produce an infrared control code and transmitting the infrared control code to a device that converts the infrared control code into a signal placed on an alternating current power signal of a power line to control the appliance.

68. The system of claim 64, wherein the transmitting step is such that the digital data is transmitted from the handset to the base unit in frames of bits, the frames including an overhead portion and a data portion, wherein the handset sends the one of the appliance control codes to the base unit within the overhead portion of one of the frames.

* * * * *